United States Patent [19]

Gavlak

[11] Patent Number: 5,385,028
[45] Date of Patent: Jan. 31, 1995

[54] METHOD OF ODOR ELIMINATION ON A/C HEAT PUMP SYSTEMS

[75] Inventor: Michael A. Gavlak, Buffalo, N.Y.

[73] Assignee: General Motors Corporation, Detroit, Mich.

[21] Appl. No.: 222,054

[22] Filed: Apr. 4, 1994

[51] Int. Cl.⁶ ............................................. F25D 21/00
[52] U.S. Cl. .......................................... 62/81; 62/133; 62/182; 62/244; 62/278
[58] Field of Search ............... 62/160, 244, 186, 180, 62/182, 277, 278, 81, 133, 158, 82, 282

[56] References Cited

U.S. PATENT DOCUMENTS

| | | | |
|---|---|---|---|
| 3,762,178 | 10/1973 | Yamada et al. | 62/157 |
| 4,094,166 | 6/1978 | Jerles | 62/158 |
| 4,178,767 | 12/1979 | Shaw | 62/186 X |
| 4,604,873 | 8/1986 | Ohashi et al. | 62/180 X |
| 4,672,816 | 6/1987 | Takahaski | 62/180 |
| 4,951,473 | 8/1990 | Levine et al. | 62/158 X |
| 5,095,711 | 3/1992 | Marris et al. | 62/81 |

Primary Examiner—Harry B. Tanner
Attorney, Agent, or Firm—Patrick M. Griffin

[57] ABSTRACT

A method of eliminating odor in a heat pump system of a vehicle includes the steps of detecting removal of the vehicle passengers and ignition key after use of the cooling mode or air conditioning of the passenger compartment heat exchanger, operating the blower, reversing the flow of refrigerant in the heat pump to place the passenger compartment heat exchanger in heating mode to remove latent moisture to eliminate odor therefrom.

3 Claims, 1 Drawing Sheet

METHOD OF ODOR ELIMINATION ON A/C HEAT PUMP SYSTEMS

TECHNICAL FIELD

The invention relates to a method of moisture rejection in a heat pump system in a vehicle of the type including a compressor operatively connected to a reversing valve.

BACKGROUND OF THE INVENTION

Passenger compartment heating and cooling are provided in most automobiles. In internal combustion engines of automobiles, an engine driven compressor runs a vapor compression air conditioning system for summer operation. In the winter, waste heat of combustion is used for heating the passenger compartment. In future vehicles designed to decrease automobile emissions, this source of propulsion energy is commonly an electric storage device, such as a battery. The amount of energy that can be stored in the currently available battery is limited, therefore there is a need to minimize the use of stored energy for other uses such as passenger thermal comfort.

It is has been proposed to use heat pump switchable systems on electric vehicles wherein refrigerant flow direction is reversible. Outside of vehicle applications, it has been determined that musty odors exist as a result of organism growth on the evaporator in the heat pump system after air conditioning use, as suggested in U.S. Pat. No. 3,762,178, issued Oct. 2, 1973 in the name of Yamada et al. The patent discloses a coolant apparatus for cooling the interior of a room in which a blower is started after a time delay from starting the evaporator to force cooled air into the room.

U.S. Pat. No. 4,094,166, issued Jun. 13, 1978 in the name of Jerles discloses an air conditioning control system which eliminates the odor problem. The patent discloses operating the evaporator fan after the compressor and the condenser fan have stopped to continue cooling. The actuation of the evaporator fan is based on an increase in efficiency rather than preventing odor.

SUMMARY OF THE INVENTION

The invention is a method of moisture rejection in a heat pump system of a vehicle of the type including a compressor operatively connected to a reversing valve and a passenger compartment heat exchanger for controlling temperature in a passenger compartment. The method includes the steps of directing the refrigerant through the heat pump system in a first direction for cooling by the compartment heat exchanger of the passenger compartment, discontinuing flow of refrigerant in response to discontinuation of vehicle operation, automatically reversing the reversing valve while the vehicle is inoperative, and directing the refrigerant through the heat pump system in a second direction opposite to the first direction for heating of the compartment heat exchanger for moisture rejection therein.

The invention also includes the steps of operating the compartment blower across the compartment heat exchanger after discontinuation of vehicle operation to blow off moisture therein. Furthermore, the sensing of discontinuation of vehicle operation includes sensing removal of the ignition key and removal of a load from the seats.

BRIEF DESCRIPTION OF THE DRAWING

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
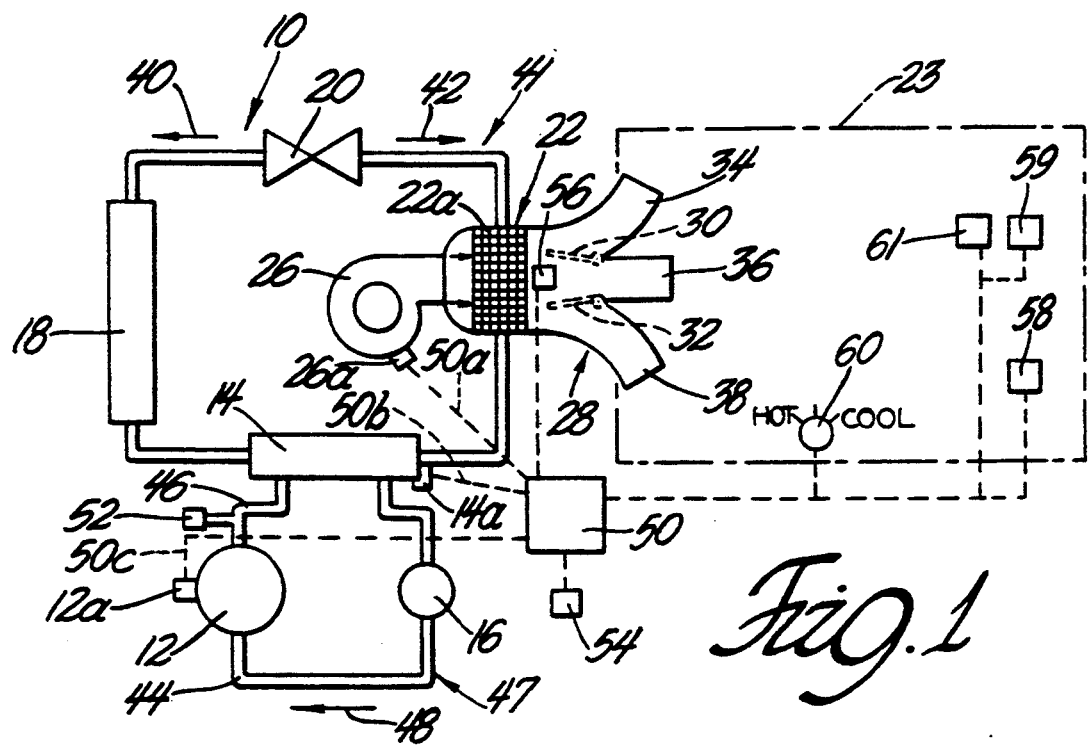
FIG. 1 is a block diagram of the subject invention.

A method of moisture rejection is used in a heat pump system 10 which removes latent moisture therein which can cause odors. As commonly known in the art, the heat pump system 10 generally includes a compressor 12 connected to a reversing valve 14 and accumulator 16. The reversing valve is also connected to a front end heat exchanger 18, and in turn to an expansion device 20, and to the compartment heat exchanger 22 back to the reversing valve 14. A compartment fan or blower 26 is operatively connected adjacent the compartment heat exchanger 22 for forcing air across the heat exchanger 22 and into the vehicle air ducts 28. The vehicle air ducts 28 include a pair of air diverter valves 30, 32 which may be independently operable to direct air to one of three channels for defrost 34, vents 36, and floor ducts 38.

The front end heat exchanger 18 and compartment heat exchanger 22 interchangeably function as an evaporator and condenser depending on the direction of fluid flow, i.e., refrigerant, in the system 10. The compartment heat exchanger 22 is utilized to heat or cool the passenger compartment of the vehicle. The components act in the manner commonly known in the art. The heat exchangers 18, 22 are of a typical air cross-flow type.

During cold weather, the heat pump system 10 flows in a first direction indicated by arrow 40 in order to heat the compartment 23 of the vehicle. The compartment heat exchanger 22 is therefore placed in heating mode. During warm weather, the reversing valve 14 will be reversed to provide flow in the direction of arrow 42 in order to provide cooling to the compartment 23 and place the compartment heat exchanger 22 in the cooling mode.

The compressor 12 includes a suction line 44 and discharge line 46. The suction line 44 is connected to the accumulator 16 and the discharge line 46 is connected to the reversing valve 14. The direction of flow in the compressor loop 47 is illustrated by arrow 48 and always flows in the same direction. The reversing valve 14 changes the direction of flow in the heat exchanging loop 41. The compressor 12 may be of any type commonly available to compress the low pressure refrigerant vapor into high pressure high temperature vapor. The accumulator 16 may be as commonly used to separate the liquid refrigerant from the vapor and acts as a liquid storage device. Furthermore, the reversing valve 14 and expansion device 20 are commonly known in the art.

Also included is a computer or controller 50 operatively connected to the compressor 12, reversing valve 14 and blower 26. The controller 50 may be of any type commonly available, which controls such components.

The computer 50 controls operation of the compressor 12, reversing valve 14 and blower 26.

A discharge temperature sensor 56 is connected in the ducting 28 on the discharge side of the compartment heat exchanger 22 to sense the temperature of the air being discharged therefrom. The temperature sensor 56 may be any type of commonly available sensors for sensing the temperature of air. This information is also communicated to the computer 50. A plurality of seat sensors 58, as commonly known in the art, communicate information to the computer 50 regarding load or no load on the seats, i.e., the presence of passengers. An ignition key sensor 59, as commonly used, transmits a signal to the computer 50 indicating removal of the key.

Optional component features include a high pressure sensor 52 connected in the discharge line of the compressor 12. The sensor 52 senses the pressure of the refrigerant exiting or being discharged from the compressor 12 and transmits same to the computer 50. This information may be used in place of temperature sensor 56 to determine high enough discharge temperature. An outside temperature sensor 54 is connected to sense the outside air temperature of the vehicle and transmit such information to the computer 50. Suitable types of such sensors are commonly known in the art.

Figure 2:
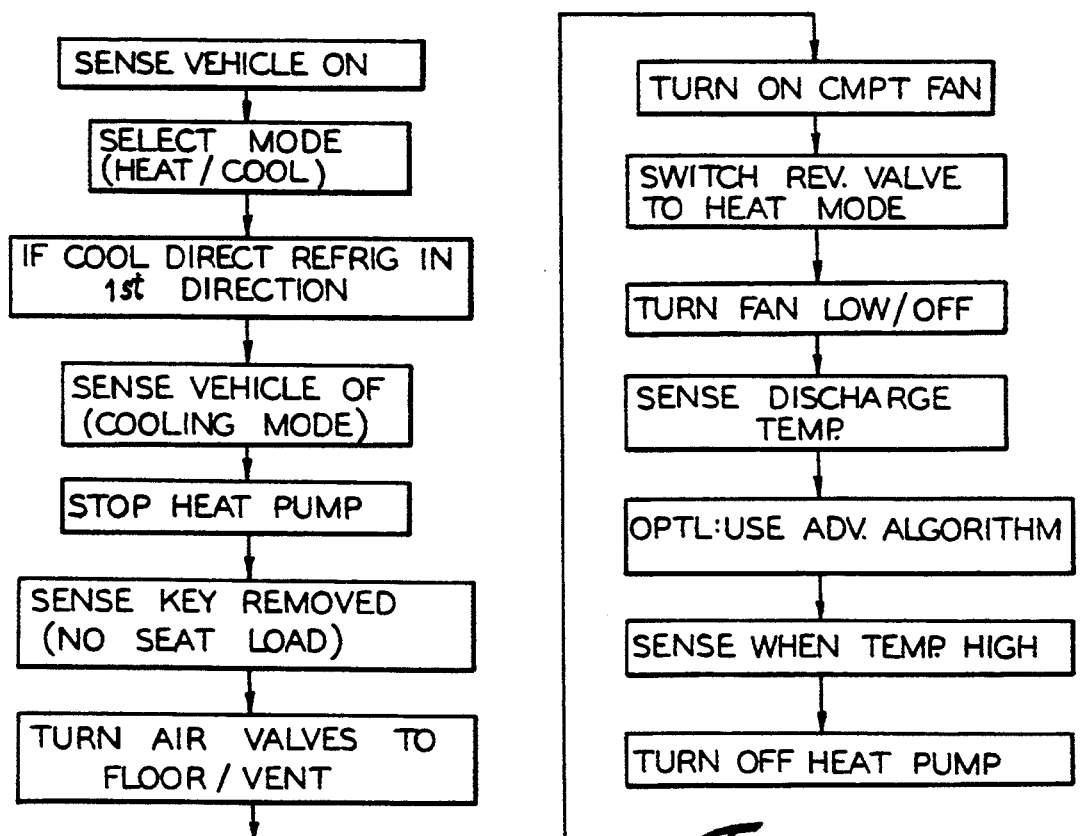
FIG. 2 is a flow chart of the method of the subject invention.

The computer 50 is programmed to operate under the flow chart in FIG. 2. Use of the sensors 52-54 are optional and provide an advanced system. The basic method will first be described with optional additions added thereto. The computer 50 acts in response to the vehicle being started with the ignition key on, and the mode is sensed by mode selector switch 60 of the vehicle, which selects the mode, i.e., heating, cooling, etc., of the HVAC vehicle system. When the vehicle is placed in cooling mode, the computer 50 controls its respective components to direct the refrigerant through the heat pump system 10 in a first direction 42 for cooling mode of the compartment heat exchanger 22 with the compartment fan or blower 26 operating. In response to discontinuation of vehicle operation, the flow of refrigerant is discontinued. Some undrained moisture will remain in the core of the compartment heat exchanger 22 which promotes the growth of fungus and bacteria causing odor. The computer 50 will control the blower 26 to be operated to force air across the compartment heat exchanger 22 to blow off latent moisture therein. The blower 26 is briefly turned on high to blow off as much moisture as possible. Thereafter, the reversing valve 14 is switched to heating mode to direct the refrigerant in the opposite or second direction 40 while the vehicle remains inoperative. The blower 26 is turned to low or off setting to allow rapid heating of the compartment heat exchanger 22 with the high temperature pressure refrigerant which it will receive.

Also included is sensing the discharge temperature of the compartment heat exchanger 22 by temperature sensor 56. The computer 50 utilizes the information from the sensor 56 to determine when a high enough temperature is reached for moisture elimination, to in turn discontinue operation of the moisture removal process of the heat pump system 10. Thereafter, the blower 26 and circulation of refrigerant is discontinued.

In the preferred embodiment, discontinuation of vehicle operation is determined by turning off of the engine, as commonly known in the art, sensed by ignition switch 61. This will stop operation of the heat pump 10. The seat sensors 58 and the ignition key sensor 59 are utilized to determine the removal of passengers from the vehicle. When both conditions are sensed, the moisture elimination process will proceed. Furthermore, the air diverter valve 32 is switched to floor delivery and valve 30 to vent delivery so that moisture is not sent to the windshield of the vehicle.

An advanced method utilizes the compressor power the blower speed, the outside air temperature by sensor 54, and the discharge air temperature by sensor 56. By using this information and vehicle specific information on air flow and refrigerant system performance, a comparison of input power versus output change in temperature can be made. The following applies:

$$\text{compressor power} \times COP_{typical} \text{ vs. air mass flow} \times C_p (T_{discharge} - T_{ambient})$$

Wherein COP is the coefficient of performance, $C_p$ is specific heat at constant pressure, T is temperature.

The compressor power and blower or fan speed are measured, the COP is taken from development tests commonly known in the art, the air mass flow is calculated from the air temperature and fan speed, the $C_p$ is the coefficient for air, and the $T_{discharge}$ and $T_{ambient}$ are measured temperatures of discharge from the compartment heat exchanger and ambient from the outside air. The refrigerant pressure indicates an outlet temperature from the compartment heat exchanger 22 capable of moisture rejection when the two above power calculations are near equal. Then, moisture elimination is complete and the heat pump system 10 may be turned off. The refrigerant pressure and associated outlet temperature can be determined from pressure vs. temperature relationships known from pressure/enthalpy diagrams or calculation.

An example of application of the above algorithm includes given or tested values of: $COP_{typical}=2.5$ $C_p=0.240$ BTU/(lbm×oR). The following values are fixed according to a particular application for example, an input compressor power of 1000 W (or 3413 BTU/Hr) an air mass flow of 100 CFM (or 441 lbm/hr). The relevant temperatures would be measured, for example, with $T_{discharge}=80°$ F. and $T_{ambient}=160°$ F., the output change in temperature would be 80° F., the equation would be satisfied, and the moisture rejection process would be completed.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A method of moisture rejection in a heat pump system of a vehicle of the type including a compressor operatively connected to a reversing valve and a compartment heat exchanger for controlling temperature in a passenger compartment, the method including the steps of:

directing the refrigerant through the heat pump system in a first direction for cooling by the compartment heat exchanger of the passenger compartment, discontinuing flow of refrigerant in response to discontinuation of vehicle operation, reversing the reversing valve while the vehicle remains inoperative, directing the refrigerant through the heat pump system in a second direction opposite to the first direction for heating of the compartment heat exchanger for moisture rejection therein.

2. A method of moisture rejection in a heat pump system of a vehicle of the type including a compressor operatively connected to a reversing valve and a compartment heat exchanger for controlling temperature in a passenger compartment, the method including the steps of:

directing the refrigerant through the heat pump system in a first direction for cooling by the compartment heat exchanger of the passenger compartment, discontinuing flow of refrigerant in response to discontinuation of vehicle operation, sensing removal of ignition key in the vehicle, sensing removal of passengers from the vehicle by removal of load from the seats, operating the blower to the compartment heat exchanger to blow off moisture therein, reversing the reversing valve while the vehicle remains inoperative, directing the refrigerant through the heat pump system in a second direction opposite to the first direction for heating of the compartment heat exchanger for moisture rejection therein.

3. A method of moisture rejection in a heat pump system of a vehicle of the type including a compressor operatively connected to a reversing valve and a compartment heat exchanger for controlling temperature in a passenger compartment, the method including the steps of:

directing the refrigerant through the heat pump system in a first direction for cooling by the compartment heat exchanger of the passenger compartment, discontinuing flow of refrigerant in response to discontinuation of vehicle operation, sensing removal of ignition key in the vehicle, sensing removal of passengers from the vehicle by removal of load from the seats, operating the blower to the compartment heat exchanger to blow off moisture therein, reversing the reversing valve while the vehicle remains inoperative, sensing compressor power use, sensing blower speed, sensing outside air and discharge air temperature, directing the refrigerant through the heat pump system in a second direction opposite to the first direction for heating of the compartment heat exchanger for moisture rejection therein based on input power versus output power.

* * * * *